(12) United States Patent
Giercke (10) Patent No.: US 7,906,695 B2
(45) Date of Patent: Mar. 15, 2011

(54) BIOMASS CONVERSION BY COMBUSTION (75) Inventor: Ronald Keith Giercke, Winnipeg (CA)

(73) Assignee: RES/OP Technologies Inc., Winnipeg, Manitoba (CA)

(*) Notice: Subject to any disclaimer, the term of this patent is extended or adjusted under 35 U.S.C. 154(b) by 1064 days.

(21) Appl. No.: 11/255,171

(22) Filed: Oct. 21, 2005

(65) Prior Publication Data

US 2006/0089516 A1   Apr. 27, 2006

Related U.S. Application Data

(60) Provisional application No. 60/621,047, filed on Oct. 25, 2004.

(51) Int. Cl.
*C10G 1/00* (2006.01)
(52) U.S. Cl. ............ 585/240; 423/648.1; 423/650; 252/182.1; 252/373; 110/110; 110/171; 110/210; 110/234; 48/197 FM
(58) Field of Classification Search ......... 585/240; 110/110, 171, 210, 234; 423/648.1, 650; 48/197 FM; 252/182.1, 373
See application file for complete search history.

(56) References Cited

U.S. PATENT DOCUMENTS

| 5,138,957 A * | 8/1992 | Morey et al. ............ 110/234 |
| 2002/0078867 A1 | 6/2002 | Paisley |
| 2003/0000144 A1 * | 1/2003 | Maton ............ 48/197 FM |

FOREIGN PATENT DOCUMENTS

CA   2442431   3/2005

* cited by examiner

*Primary Examiner* — In Suk Bullock
*Assistant Examiner* — Prem C. Singh
(74) *Attorney, Agent, or Firm* — Adrian D. Battison; Ade & Company Inc.

(57) ABSTRACT

Break down of waste materials such as animal parts is carried out by pyrolysis, gasification and combustion using a reactor vessel with a conical lower portion located within an exterior vessel. Feed material is deposited in continuous mode through an air lock at the top and falls by gravity alone into the lower cone portion. The cone geometry supports organic feedstocks, eliminating the requirement for grates or other combustion support systems. Organic material that may escape gasification and exit the bottom of the cone accumulates within the ash and carbon particle volume until burned. Carbon is sequestered from high energy feedstocks and is stored in a chamber below the gasification cone. This carbon supplements the energy output of lower energy feedstocks to maintain desired operating temperatures at all times.

29 Claims, 6 Drawing Sheets

BIOMASS CONVERSION BY COMBUSTION

This application claims benefit under 35USC119 of the filing date of Provisional Application 60/621,047 filed Oct. 25, 2004.

This invention relates to a method for combustion. The method may be used for breaking down waste materials by pyrolysis, gasification and combustion in a close coupled combustion process. The method disclosed herein may be used for animal waste including deadstock, animals parts, manure and can also be used for other waste organic materials including household, municipal, medical, commercial and hazardous wastes.

The method and apparatus disclosed herein can be used for effectively disposing of deadstock and animal materials while maintaining a temperature sufficient to destroy pathogens including prions.

The method and apparatus disclosed herein can be used to effectively dispose of animal waster material including materials having a moisture content greater than fifty percent with random batches consisting of 100% water (e.g. contaminated blocks of ice) while maintaining the operation of the system and the required temperatures without the necessity for additional fossil fuels.

The method and apparatus disclosed herein can be used to extract carbon. Where excess levels of carbon are produced beyond those necessary for maintaining the required temperature, residual carbon can be extracted and sequestered rather than released into the atmosphere as carbon dioxide.

BACKGROUND OF THE INVENTION

Many jurisdictions presently face a crisis in the disposal of deadstock, offal and manure produced by the livestock industries. Disposal in landfill or burial sites is of course highly undesirable since any pathogens remain in the soil and since the breakdown of the products is uncontrolled and can lead to contamination. Many landfill sites do not accept deadstock or offal and in many cases those that do require high charges for disposal fees.

Uncontrolled disposal can lead to the risk of disease transmission to, and via, scavengers, insects, and the population at large. Composting either can require opening carcasses or carcass pathogen escape as carcasses decompose and can produce contamination and unpleasant odours.

The disposal of manure from hogs is problematic in view of the facts that it is primarily a slurry containing relatively high levels of water so that combustion is typically unavailable as a best method for disposal. Spread of the material on fields is costly and can lead to contamination.

There are combustion devices available for carrying out combustion of deadstock and animal parts. Many of the machines are batch processes at relatively low productions rates so the individual animals must be inserted into a containers and combustion carried out until the materials are destroyed and expelled through flue gases leaving some solid materials for collection and potential use. Often larger animal carcasses require dissection or dismembering. Such batch processes generally require the addition of fossil fuels to commence, and often to maintain the combustion at the temperatures required, even though in many cases the materials to be combusted generally have sufficient energy contained to maintain the combustion through the process, provided the system is managed properly. If additional fuel is therefore used, excess energy is produced in some situations leading to inefficiency.

SUMMARY OF THE INVENTION

It is one object of the invention to provide a method for breaking down materials by pyrolysis, gasification and combustion.

According to one aspect of the invention there is provided a method for combustion comprising:

providing a combustible feed material;

providing a reactor vessel for containing the feed material in an oxygen starved environment;

locating the reactor vessel at least partly within an exterior vessel(s) such that combustion of material in the exterior vessel(s) causes heating of the feed material in the reactor vessel;

feeding the feed material into the reactor vessel through an air lock feed system;

causing the combustion in the enclosing vessel(s) to heat the feed material in the reactor vessel to a temperature above 600 degrees Celsius so as to cause the feed material to break down to breakdown products including carbon, water vapour and combustible gases;

causing the breakdown products to exit the reactor vessel into the exterior vessel(s) for combustion therein to form combustion products;

providing a flue for extraction of the combustion products from the exterior chamber and generating a flow of the combustion products from the exterior chamber into the flue;

introducing combustion air into the downstream chambers and mixing with the breakdown products to effect combustion thereof; and providing an extraction system for non organic solid materials from a bottom of the exterior vessel.

According to one independently important feature of the invention the reactor vessel is formed from a ceramic material.

Preferably the exterior vessel is lined with a ceramic material.

Preferably the ceramic material is a sintered silicon carbide similar to the SAINT-GOBAIN ADVANCED CERAMICS structural ceramic product named HEXOLOY.

According to one independently important feature of the invention the reactor vessel includes a part which projects into the exterior vessel in a manner which allows the combustion gases to pass around the reactor vessel for heating the reactor vessel.

Preferably the combustion gases pass around four sides.

Preferably the reactor vessel descends down into the exterior vessel.

Preferably the reactor vessel is generally conical converging from an upper mouth into which the feed materials are deposited to a bottom opening.

According to one independently important feature of the invention the reactor vessel includes an upper mouth and a bottom discharge opening such that the feed materials pass therethrough by gravity and wherein the reactor vessel is shaped such that feed material fed into the reactor vessel is restricted in flowing downwards to the open bottom discharge opening sufficiently to allow the breakdown to occur.

Preferably the restriction is provided by a conical shape of the reactor vessel.

Preferably the restriction is provided by members located on an inner surface of the reactor vessel.

Preferably the members are movable relative to the inner surface.

According to one independently important feature of the invention there is provided a bed of carbon at the bottom of the exterior vessel onto which the solid breakdown products from the reactor vessel fall.

According to one independently important feature of the invention the breakdown products from the reactor vessel are free to fall onto the bed of carbon without any intervening grate such that the feed materials can fall from the feed inlet to the bottom of the exterior vessel by gravity and are maintained in the reactor vessel for breakdown by the shape and arrangement of the reactor vessel and are prevented from reaching the bottom of the exterior vessel by the carbon bed.

According to one independently important feature of the invention the materials move from the feed opening to the bottom of the exterior vessel solely by gravity without assistance of moving elements providing motive power thereto.

Preferably wherein the temperature of the exterior vessel is maintained at a required temperature above 600 degrees Celsius by controlling air inlet into the exterior vessel.

According to one independently important feature of the invention there is provided a carbon bed in the exterior vessel from the carbon produced in the breakdown and the variation of the air inlet causes air to increase or decrease the rate of combustion of the carbon bed.

Preferably heat from combustion of the carbon bed is used to maintain the temperature at the required temperature without additional fuel.

Preferably the feed material can include more than 50% water content, with random batches containing up to 100% water content, while the carbon bed maintains the temperature at the required temperature without additional fuel.

Preferably the feed material includes a slurry containing at least 50% water and wherein the reactor vessel is shaped and arranged to maintain the slurry in the reactor vessel for a sufficient period of time to effect said breakdown while allowing the breakdown products to fall from the reactor vessel under gravity.

Preferably the temperature is measured at the outlet of the exterior vessel to maintain the temperature above the required temperature.

According to one independently important feature of the invention is carbon being produced from the process to reduce the release of carbon dioxide to the atmosphere by removing carbon from a carbon bed at the bottom of the exterior vessel.

Preferably the feed material includes animal deadstock and parts and wherein the temperature is maintained in the exterior vessel at above 1250 degrees Celsius in order to destroy any pathogens.

Preferably there is provided a water injection system for adding water into the reactor vessel.

Preferably the combustion is effected without the addition of fossil fuel.

Preferably the air lock feed system is operated to add feed materials to the reactor vessel to maintain feed products in the reactor vessel for operation in a continuous mode.

The invention also provides an apparatus having the same features as set forth above.

According to one independently important feature of the invention, the process involves configuring combustion regions to minimize, eliminate as practicable, flame contact with component surfaces except the surfaces of reactor cones constructed of ceramic materials. Combustion air is dispersed into the combustion chamber through a proprietary arrangement of perimeter openings in the combustion chamber perimeter such that, as practicable, the product gas flame occurs "in space"; i.e. the cavity between the gasification cone and combustion chamber enclosure. The invention utilises radiation for the instantaneous (speed of light) transfer of product gas flame energy onto "line of sight" surfaces that, due to fundamentals of radiation at higher operating temperatures (above 1,000 deg. C.), minimize temperature differentials between "line of sight" surfaces. This allows much higher operating temperatures for components fabricated of similar materials than possible where significant flame impingement occurs on combustion chamber surfaces.

According to one independently important feature of the invention, the process involves two negative pressure chambers, an upper wet feedstock conditioning chamber and a lower, in-line, high temperature reaction chamber. Controlled volumes of preheated combustion air are drawn into the top of the upper chamber. A system of deflectors around the interior surface of the upper chamber provides an annular space around feedstock therein, creating a preheated combustion air flow path down into the lower, high temperature reactor chamber. This feature facilitates evaporation of water that may be at or near the vertical perimeter surface of the feedstock charge, preventing liquid water flow onto lower chamber, high temperature surfaces.

Preferably air from the upper chamber fuels the random combustion (depending on feedstock quality and moisture content) of mainly feedstock and product gas generated at and near the feedstock-lower chamber surfaces interface. The combination of this combustion and radiation from the lower chamber interior surfaces collectively contribute to the feedstock destruction rate. The lower chamber is engulfed in flame resulting from combusting the remainder of product gas that exits the lower high temperature chamber and, when supplied with controlled combustion air volumes, portions of the charcoal inventory at the bottom of the system.

Preferably the inner surface of the lower, high temperature chamber contains both top-to-bottom gas passage ways and openings in the chamber wall that allow unrestricted flow of gases around feed material therein and ready escape through numerous exits, including a bottom opening, into the external vessel that surrounds the lower, high temperature reaction chamber.

The arrangement described in detail hereinafter can provide one or more of the following features:

Complete organic materials combustion at high temperatures with no requirement for supplemental fuels, all at feedstock moisture contents up to the limit of thermal energy in the organic component (as high as 70% water for biomass) and lump sizes up to whole, largest ruminant carcasses.

Dissociating and accumulating elemental carbon for either sequestering/selling or combustion to sustain operation during low energy feedstock transients.

Continuous, sequential batch, high temperature, high rate, pyrolysis/gasification process accomplished without flame impingement on component surfaces.

Hazardous organics destruction ready to required Standards.

The system chambers have two second (minimum) retention (actual gas volumes) at temperatures greater than 1,210° C. (greater than 1,900° C. attainable with feedstock energy only; special materials required in high temperature regions).

No additional retention chambers or supplemental fossil fuel energy required.

Universally configured component geometries facilitate continuous feedstock material flow (by gravity) through combustion processes. No grates or internal mechanical conveyance systems are required.

Large turn down ratios (10:1) with fast recovery to high temperature operation by combusting portions of carbon reserve.

Adaptable internal component configurations customized to feedstock characteristics.

No feedstock preparation is required, except for gross sizing for passage through system openings.

No feedstock drying is required as long as average energy content of organic component exceeds minimum necessary to maintain the minimal elemental carbon reserve necessary to sustain desired operating temperatures during transients.

The method tolerates (automatically) random, rapid and extreme fluctuations in individual, or any combination or permutation thereof, feedstock quality, lump size and moisture content.

The method tolerates large, and wide ranging fractions and shapes of metal and mineral content in feedstock. Metal and mineral lump size limited only by the smallest passage dimension.

Capability to melt metals and minerals by burning elemental carbon component of feedstock in dedicated, high temperature chamber.

These advantages can be obtained by an arrangement in which organic materials are gravity fed into a conical shaped gasification chamber where the organics are gasified upon contact with interior surfaces. Gasification occurs in an oxygen free environment. Passageways on the inside of the gasification chamber allow the unrestricted flow of vapours and gasification product gases towards the bottom of the cone. Ash, clinkers, and unburned carbon particles exit the bottom of the cone via gravity.

Carbon is sequestered from high energy feedstocks and is stored in a chamber below the gasification cone. This carbon supplements the energy output of lower energy feedstocks to maintain desired operating temperatures at all times.

The cone geometry supports organic feedstocks, eliminating the requirement for grates or other combustion support systems. Organic material that may escape gasification and exit the bottom of the cone accumulates within the ash and carbon particle volume until burned along therewith; leaving only non organic ash as a solids emission.

The gasification cone is situated inside an enclosing container through which thermal radiation can neither enter nor escape. Thermal energy from the combustion of the product gas exiting the cone (and supplemental carbon particle combustion where required) is transferred via thermal radiation to both the cone and the enclosing container. Thermal radiation tends to equalize the surface temperatures of both the cone and its enclosing container.

Combustion air used to oxidize the product gases leaving the gasification chamber and carbon particles in the sump is preheated to over 1,000 degrees Fahrenheit.

A two stage combustion process is provided for the product gas emitted from the gasifier chamber with the second stage operating at minimum outlet flue gas temperature of 2,500° F. (attained with feedstock thermal energy only; no fossil fuel or other auxiliary energy inputs) is accomplished by restricting combustion in the first stage to between about 70% to 85% of organic material with final, complete combustion of gasses and gas conveyed organic materials occurring in the second stage.

A retention time of at least the order of two seconds in the second stage combustion chamber (at actual gas flow rates and temperature therein) facilitates complete combustion of organic materials and eliminates the requirement for gas emissions controls when processing biomass. Ash thereof consists of minerals and metals only.

Carbon retained in the processor sump eliminates requirement for feedstock drying and batch moisture management as long as one half hour average contains sufficient thermal energy to sustain process temperatures; e.g. one feedstock batch can be 100% water (contaminated ice block for example).

Carbon retention for consumption, which acts to maintain temperatures when processing low energy feedstock batches and rapid response first stage combustion chamber temperature controls eliminate the requirement for feedstock quality management; e.g. the combustion can process a batch of relatively low feedstock quality such as leather followed by a batch of rubber tires; automatically and unattended.

Rapid response anticipatory controls with a residual oxygen sensor in the stack gas stream mitigates smoke emissions during extreme variations in feedstock batch quality. A rapid rise in the stage one combustion chamber temperature indicates an event of extreme increase in feedstock quality (energy content). Such an occurrence causes the control system to immediately reduce stage one combustion air supply (thus temperature around the feedstock gasification cone; slowing processing rate), initiate/increase combustion air bypass around the heat exchanger to further cool stage 1 combustion chamber (if required), and positions a second stage combustion air damper 100% open to maximize organic burn rate therein and residual oxygen in stack gas stream.

The configuration is able to process hazardous materials to destruction because of a negative pressure process (prevents material escape) and retaining materials for two seconds (minimum) in the second stage, high temperature (2,500° F. minimum), residual oxygen chamber.

The grate free configuration and a large diameter ash auger eliminates the requirement to remove metal components from feedstock (e.g. rail tie spikes, hinges on demolition materials, etc.).

High temperature, radiant gasification eliminates the requirement for sizing feedstock (other than to pass through the feed system openings) by reducing organic materials from outside surfaces inwardly. There is no requirement for air or gas flow through the feedstock. Gasification occurs at the feedstock plug surfaces.

High temperature flue gas-to-combustion air heat exchanger that utilizes radiant energy distribution theory to mitigate hot spots at continuous hot side inlet temperatures of 2,500° F. and periodic migrations up to 3,000° F.

The first stage of the two stage process converts biomass and non toxic organics to three common components, product gas, carbon and water vapor. This facilitates predictable, repeatable conversion of product gas (similar components but different proportions to natural gas) and carbon to particulate free gas emissions in the second stage; eliminating requirement for stack gas processing equipment/systems.

BRIEF DESCRIPTION OF THE DRAWINGS

One embodiment of the invention will now be described in conjunction with the accompanying drawings in which.

DETAILED DESCRIPTION

Figure 1:
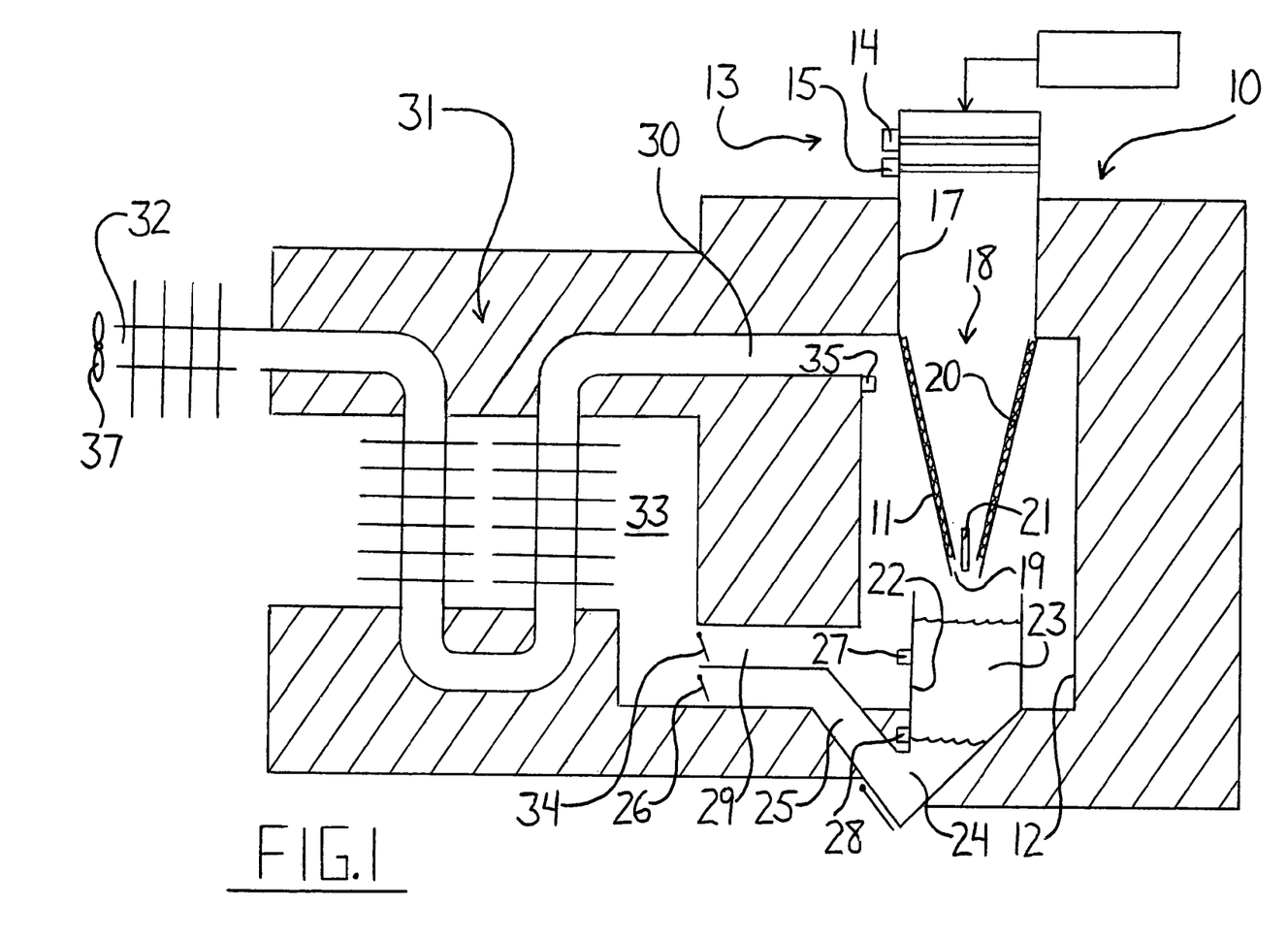
FIG. 1 is a cross sectional view of the combustion components only of a combustion system according to the present invention.

In FIG. 1 is shown a combustion chamber generally indicated at 10 which includes an interior reaction vessel 11 and an exterior combustion vessel 12 within which the combustion occurs. Feed materials are fed into the reaction vessel 11 by a feeding system generally indicated at 13 which includes an air lock system defined by gates 14 and 15 which can be operated sequentially to allow materials between the gates to be deposited into the reaction vessel 11 for breakdown. A conveyor 16 is provided in the form of an elevator which raises the materials from the ground to the necessary height above the feeding system 13 so that when dropped into the feeding system, the remainder of the operation is effected by gravity through the primary chamber 11 into the exterior chamber 12 without the necessity for any moving elements to carry the fed materials. From the feed system 13, the feed materials are carried through a chute 17 and into the interior of the reaction vessel 11.

The reaction vessel 11 is shaped and arranged so that the feed materials drop onto side walls of the vessel which are inclined downwardly and inwardly underneath the chute 17 so that the materials are restricted from falling straight through the vessel 11 and initially engage surfaces of the vessel 11 so as to receive heat from the walls of the vessel 11 to a degree sufficient to carry out breakdown of the materials.

In the embodiment shown in FIG. 1, vessel 11 is in the form of a conical structure that extends from an open mouth 18 at the upper end downwardly to a bottom mouth 19 of smaller dimensions then the mouth 18 so that the walls extend underneath the mouth 18.

Figure 3:
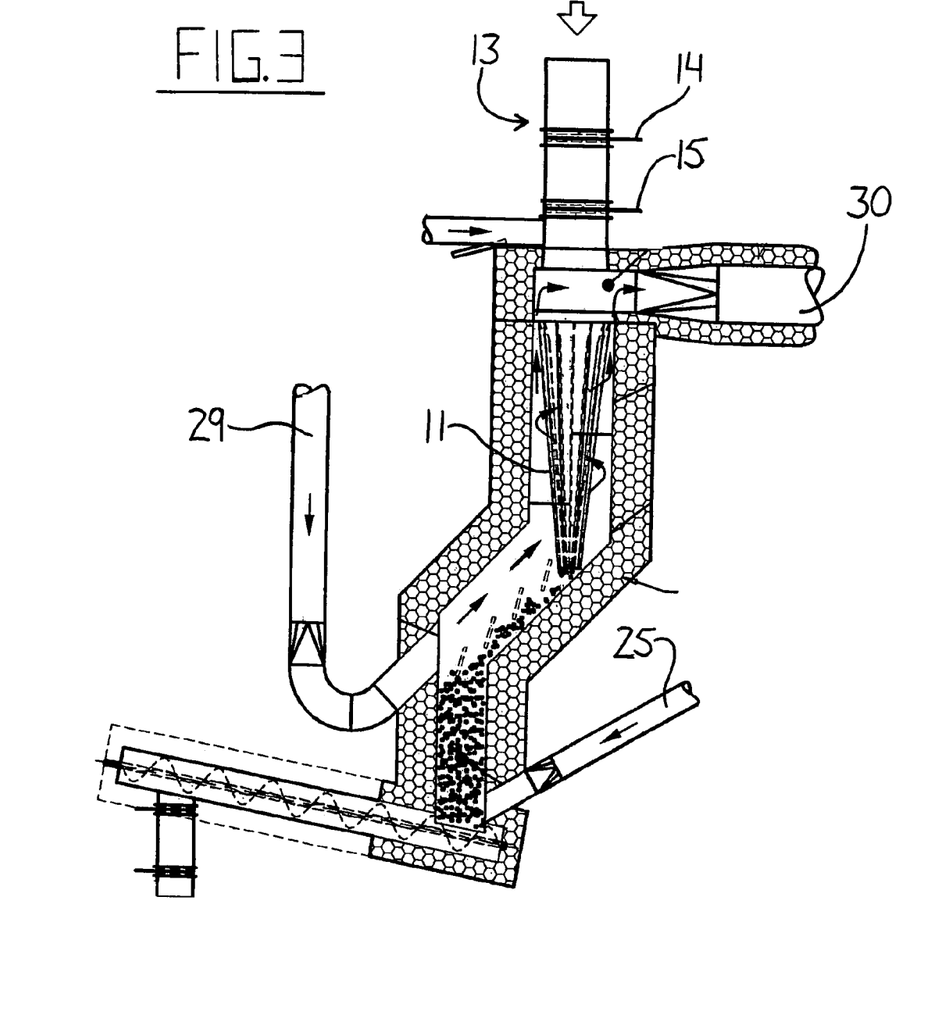
FIG. 3 is a cross sectional view of a modified combustion chamber for use with the system according to the present invention.
Figure 4:
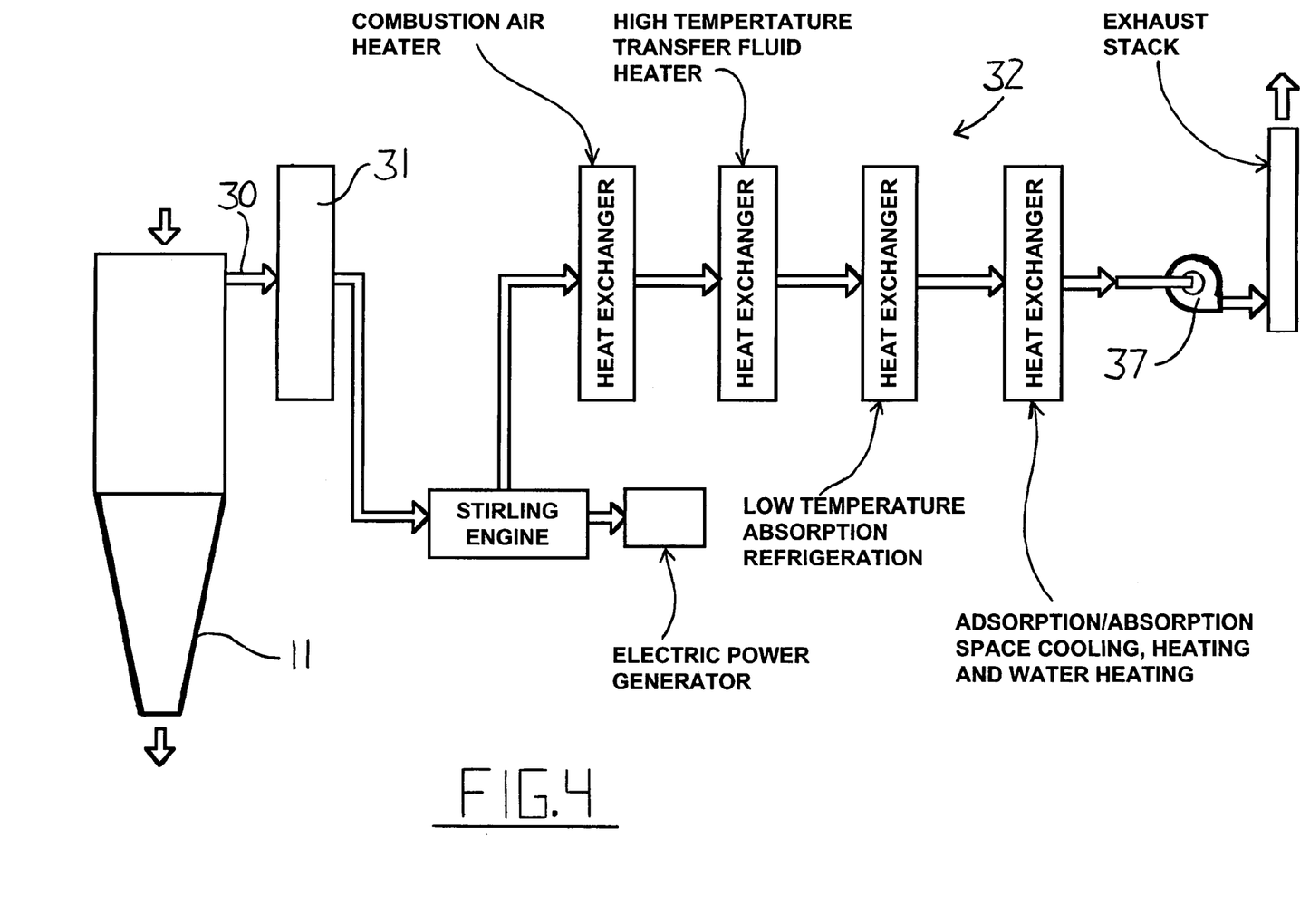
FIG. 4 is a schematic illustration of the whole system including the energy extraction systems.

The dimensions of the conical shape are selected so the materials can fall through the bottom mouth 19 under gravity but are restrained within the primary sufficiently to at least commence and preferably complete the breakdown of the materials to the components of carbon, water vapour and produce a gas. The angle of convergence of the side walls will vary depending upon the type of material with which the device is intended to operate. In a situation where the device is intended to operate with primarily or commonly slurry with very high water content, the angle of the surfaces may be significantly increased as shown in FIG. 3 so that the time of dwell of the slurry material on the surfaces is increased sufficiently to cause heating of the slurry to drive off primarily the water vapour prior to breakdown of the remaining materials into carbon and producer gas while heating the materials to the required temperature described hereinafter.

It will be appreciated that a very high angle of inclination of the material which assist in maintaining the flowable material to the slurry in the surface may in many cases be unsuitable for materials which has a higher content of solid materials since materials may collect on an inclined surface which has a higher angle and allows the material to discharge by gravity and such collection my interfere with the operation of the device.

Though materials are fed in both solid and in slurry form, the solid materials may collect on the surfaces thus impeding or slowing the flow of the slurry sufficiently to form a mass within the primary vessel which carries out the heating and breakdown of the materials within the primary vessel.

As the breakdown primarily occurs at the surface where the heat is at a maximum, the materials sitting on the surface tend to breakdown from the surface allowing the remaining materials to migrate toward the surface for further breakdown. Thus a combination of solid and liquid materials can provide in effect a plug of the feed materials within the vessel which moves towards the surfaces and then is carried by gravity acting upon the solid materials to move downwardly through the bottom mouth 19.

In order to assist in maintaining the materials on the surface for an extended period of teem, there may be provided on the surface baffles or guide plates or other elements which assist in interfering with the simple sliding movement of the material over the surface. One preferred example of elements which can be carried on the surface which restrict the flow of the materials over the surface but can move to allow larger elements of the materials to pass by is provided by a series of chains 20 which are mounted on the surfaces defining the primary vessel at the top of the vessel and hang downwardly toward the bottom mouth 19. Such chains are free to move about so that any larger solid elements can pass by the chains and through the open mouth, while the chains tend to restrict slurry or other materials of a smaller nature from sliding too quickly over the surface.

The open mouth 19 may include one or more slots 21 around the periphery so that the producer gas tends to escape from the vessel at a position spaced outwardly and upwardly from the open mouth so that the gas is free to escape even if the bottom mouth 19 should be partly or wholly closed by collecting materials. The producer gas thus burns as it escapes through the slot around the periphery of the reaction vessel so that heating is applied directly to the outside wall of the reaction vessel.

The exterior vessel 12 surrounds the whole of the outside wall forming the reaction vessel 11 so that combustion occurring within the exterior vessel 12 acts to heat the whole of the wall of the vessel 11. Above the vessel 11 the chute 17 is located in an area which is insulated so that little or no heat or reduced amount of heat is applied in that area however the vessel 11 itself is simply formed by a non-insulated wall. Thus heat is transferred from the combustion occurring in the exterior chamber to the outside wall of the reaction vessel to effect the breakdown of the materials as described above at the temperatures described hereinafter.

The exterior chamber defines a bottom collection zone 22 for collecting carbon in solid form falling from the open mouth 19. The carbon thus forms a carbon bed which extends to the bottom of the chamber 12. The top of the carbon bed can vary in height within the chamber 12 and may indeed extend above the height of the mouth 19. The carbon bed extends downwardly to a layer of ash 24 which is collected below the carbon bed 23. The ash is extracted from the bottom of the chamber 12 by an extraction auger (not shown). Duct 25 is a carbon sump combustion air supply. Combustion air flow control gate 26 meters the entry of air through the ash layer 24 and into the carbon bed 23 through the outlet duct 25.

The carbon bed 23 provides two functions. Firstly it provides a source of heat energy which can be assembled or collected during times of excess heat energy within the feed material so that the carbon bed builds up during this time period. During time periods when the heat energy within the feed materials is below the requirement to reach the required temperature, carbon can be burned from the carbon bed thus depleting the carbon bed. This may occur when the feed materials are high in water content. Thus there is no necessity to add additional fossil fuels within the combustion chamber 12 due to the provision of the energy source defined by the carbon bed 23. It will be appreciated that suitable management of the total quantity of heat energy within the feed materials must be controlled so that the energy level must be sufficient so that the depletion of the carbon layer can only be temporary and cannot continue on a permanent basis since otherwise the carbon material would be eventually completely depleted. For this purpose a sensor 27 can be provided which detects the top level of the carbon bed. A second sensor 28 can also be provided to detect the level of the bottom of the carbon bed at the intersection with the ash 24. A duct 29 provides a combustion air supply to the product gas into chamber 12 above the carbon bed top surface.

Secondly the carbon bed provides a base onto which materials falling from the primary vessel can drop. In most cases the material exiting from the mouth 19 is the carbon itself which falls onto the bed and supplements the bed. However in the case where some materials pass through the primary vessel without the complete breakdown having occurred, such materials fall onto the top of the carbon bed and are maintained by the carbon bed supported within the burning carbon so that the further required breakdown can occur.

Thus there is no necessity for a grate or other horizontal support which contains the carbon or other burning material so that the structure is in effect "grateless".

The top surface of the carbon layer can extend upwardly above the mouth 19, in which case the carbon layer will begin to collect within the interior of the primary vessel 11 and thus restrict the volume remaining within the vessel for the breakdown of the feed materials. In the event that this is expected to be temporary, the carbon level can be left at the elevated position until it is again depleted by supply of feed materials of reduced thermal energy.

However in the event that the carbon production is expected to exceed the carbon requirement for supplying heat, the discharge auger (not shown) can be operated to extract the carbon bed at a rate to maintain the upper level of the carbon bed at the required position or periodically depending upon a measured height of the carbon bed.

Combustion occurs within the exterior chamber 12 of both the carbon in the carbon bed and of the production gases exiting from the mouth 19. This combustion is contained within the chamber 12 which is surrounded by insulating material to maintain the temperature within the combustion chamber 12 at a required elevated temperature.

Figure 2:
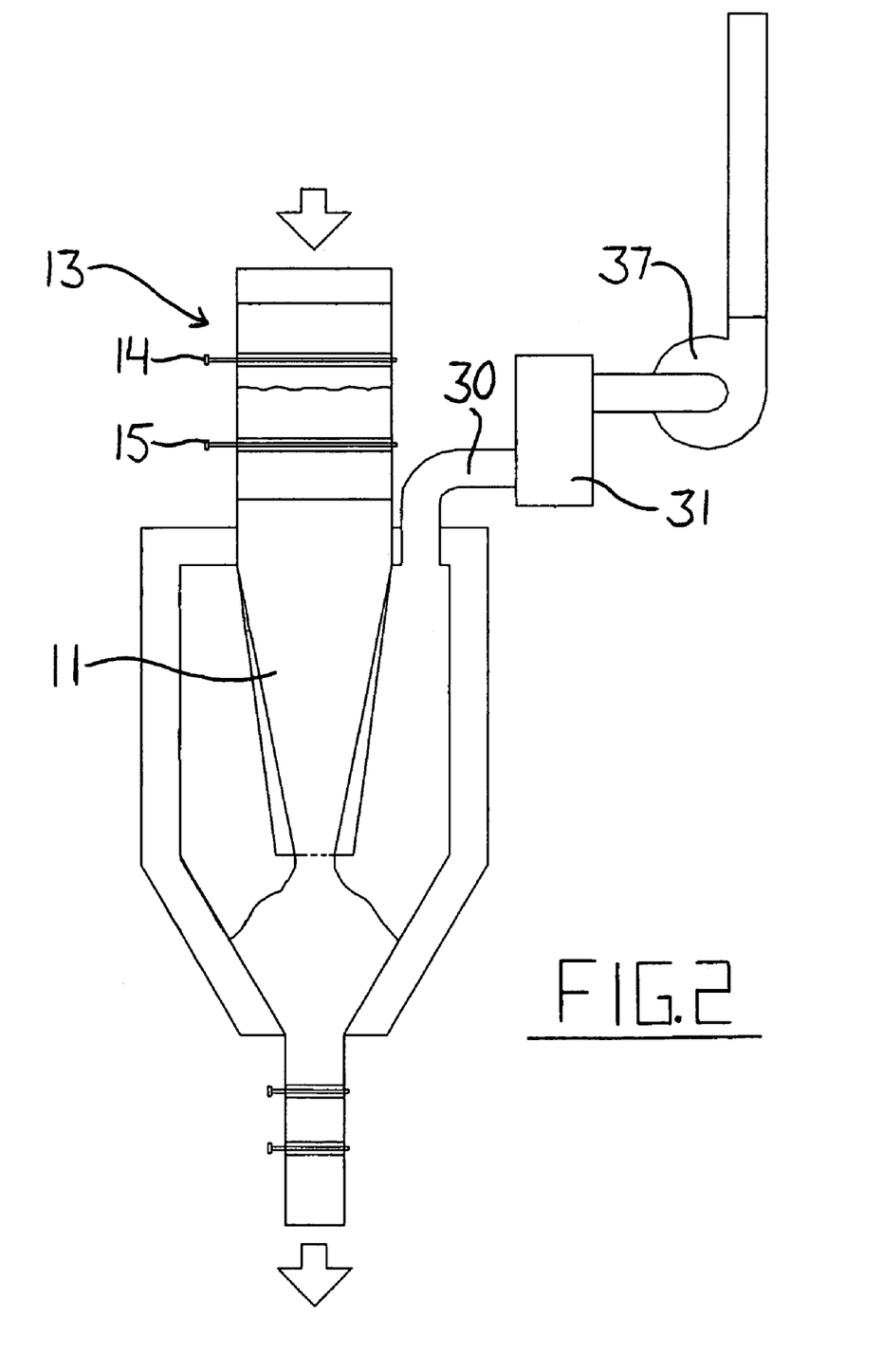
FIG. 2 is a schematic illustration of the system of FIG. 1.

The completely burnt gases within the combustion chamber exit through a flue 30 into a heat exchanger 31 and from the heat exchanger into an exit system 32. The exit system is connected with a plurality of known elements for extracting energy from the heated flue gases either in the form of motors such as a Stirling engine or as a heat exchangers from which the heat extracted is used for various purposes including heating other process, heating building, cooling buildings and the like. The heat exchanger 31 provides air into a chamber 33 which supplies air to ducts 25 and 29 via control dampers 26 and 34.

The arrangement described above therefore provides a system for converting organic waste including harvested biomass and diseased plant and animal material into electrical, heating and cooling energies, sterile water and carbon or charcoal.

The system operates at temperatures in excess of 1200° C. (2200° F.) as detected by a temperature sensor 35 at the exit of the combustion chamber 12. The system therefore transforms the feed materials containing potentially dangerous pathogens into emissions-compliant materials consisting mainly of carbon dioxide, water vapour and sterile ash. Emission are greenhouse gas neutral when processing untreated plant and animal materials.

The dual gate feedstock air lock at the inlet into the primary chamber ensures that the primary chamber can operate at the required temperature without heat escaping through the feed system or air entering through the feed system to interfere with the breakdown of the materials within the primary vessel. The system is maintained under negative pressure by an inducted draft fan 37 shown schematically in the flue 32 so that it acts to draw air into the system through the ducts 25 and 29. Duct 29 via the control damper 34 provides combustion air plus residual oxygen to the producer gas.

The system can be started by operating the fan draft with both feedstock air lock gates open while low moisture content biomass such as saw dust, sunflower seeds, wood shavings is burned in the primary chamber 11 until minimum system operating temperatures are obtained as detected by the temperature sensor 35. In this case the system is changed to operating mode in which the feed gates are closed and the producer gas combustion/residual oxygen air is controlled by the dampers 34 and 26 which provide air to the charcoal bed to provide the burning of the charcoal bed and producer gas to provide the required temperature within the combustion chamber.

The system is operated by detecting the temperature 35 and supplying sufficient air to burn the charcoal bed and producer gas to maintain the required temperature. Start of duration will range from approximately twenty to forty minutes depending upon the capacity.

The organic material is converted in an oxygen starved environment into water vapour, producer a gas and carbon in the gasification chamber or primary chamber. Producer gas is similar in composition to natural gas but is at a lower energy content. The energy content of the producer gas will vary over a wide range depending upon feedstock quality and moisture content, likely between two hundred and five hundred btu/cubic foot which is approximately twenty percent to fifty percent of the energy of natural gas.

The feedstock air lock prevents oxygen entry into the primary chamber 11 during production of the super heated combustible gases. The superheated combustible gases (mainly producer gas) exit the bottom of the reactor chamber and burn around the exterior thereof as permitted by the controlled inflow of flue gas pre-heated combustion air. The carbon component accumulates in the bed underneath the mouth 19. The preheating of the inlet air in the heat exchanger 31 ensures that the maximum efficiency of combustion occurs within the chamber 12.

The system reduces feedstock to inert ash material volumes in the range of 0.5 percent to 10 percent of the original depending upon the non combustible material and moisture content of the feedstock. The matter reduction will depend upon the type of feedstock including wood, straw, deadstock, offal, manure, municipal/medical/industrial wastes together with the water content and voids within the feedstock which carry air into the system through the feed air lock.

Figure 5:
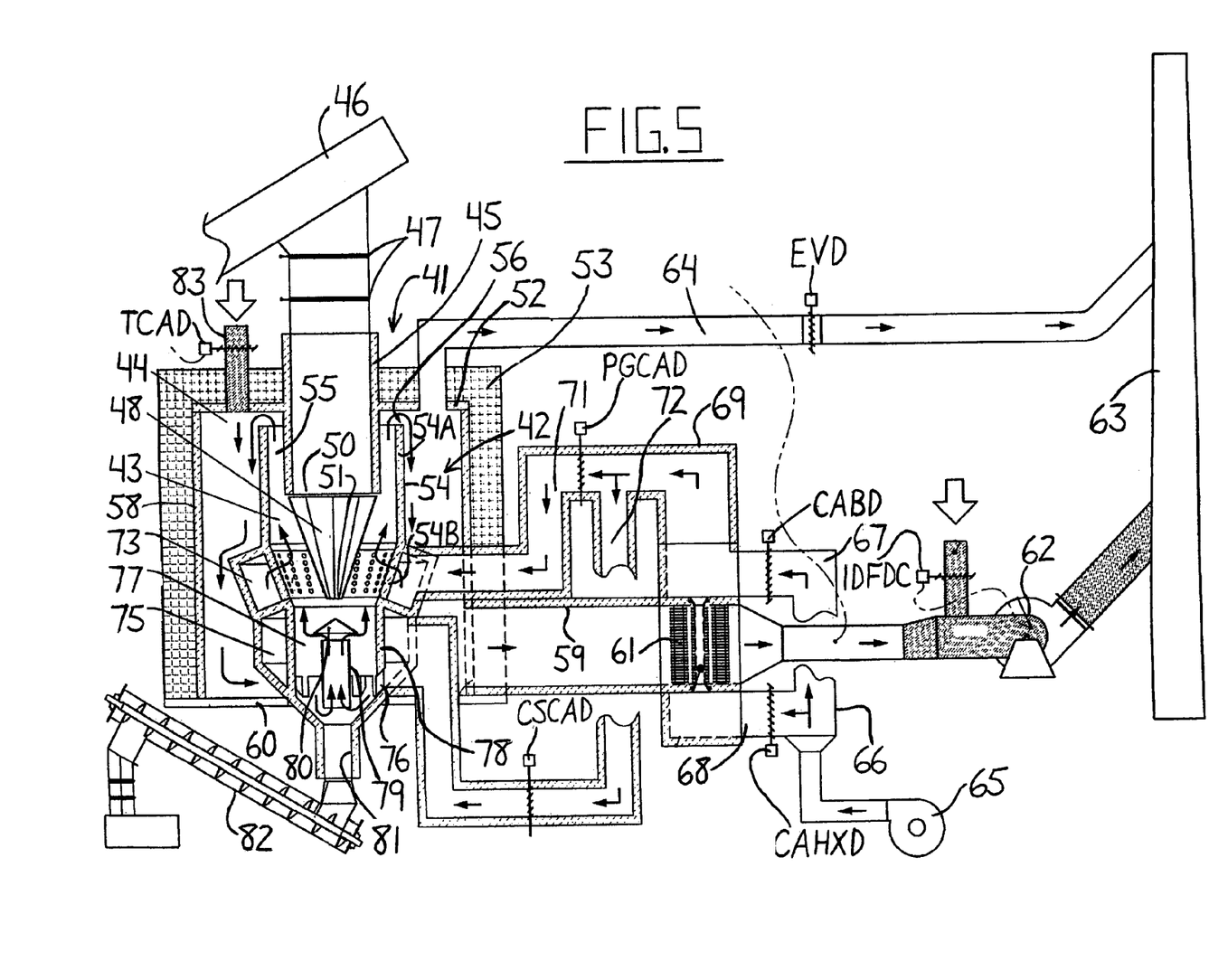
FIG. 5 is a schematic illustration of the complete system of a second embodiment of combustion system according to the present invention wherein the combustion chamber is formed in two parts.
Figure 6:
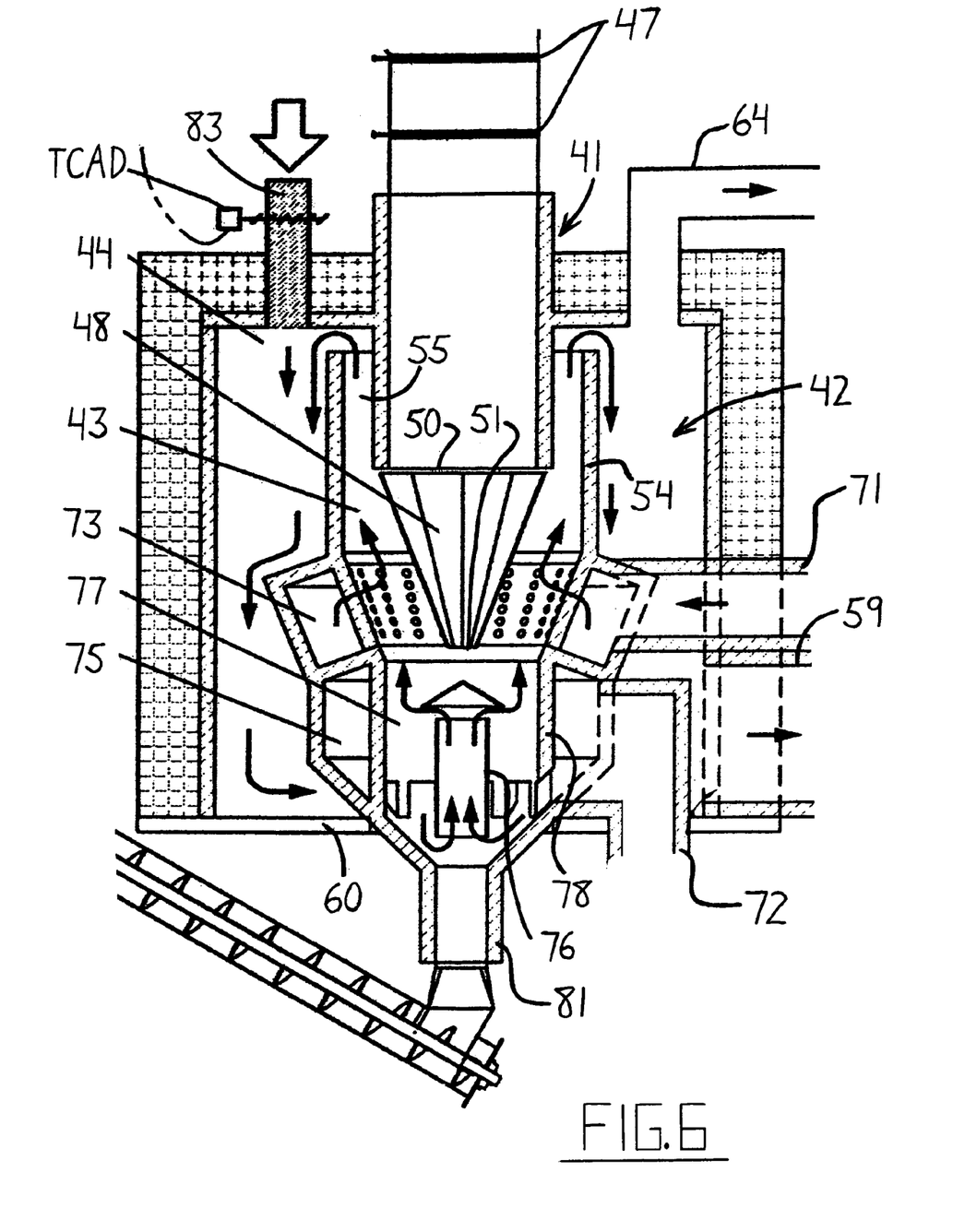
FIG. 6 is a cross-sectional view of the combustion chamber of FIG. 5 on an enlarged scale.

The system illustrated in FIGS. 5 and 6 comprises a combustion chamber generally indicated at 40 defined by a reactor vessel 41 and an exterior combustion chamber 42. The combustion chamber 42 is divided into an interior or first combustion stage 43 and an exterior or second combustion stage 44.

The reactor vessel 41 includes an upper portion 45 which is fed with the feed stock from a conveyor 46 which discharges the feed material through a pair of airlock gates 47. At the bottom of the first portion 45 of the reactor vessel 41 is provided a conical lower portion 48 which controls the gasification of the feed stock in the first gasification stage.

The conical portion 48 of the reactor vessel thus converges from an upper mouth 50 downwardly to a bottom end 51 and provides an inner surface which controls the flow of the feed stock over the surface while the feed stock is heated to effect the gasification as discussed herein. The surface of the conical section may include channels and guides and elements which control the movement of the material and allow the product gas to flow over the surface to the mouth 51 for discharge.

The combustion chamber 40 includes an exterior wall 52 which is covered by a layer of insulation 53. The first portion 45 of the reactor vessel extends through an opening in the upper horizontal wall portion of the chamber 52 so that an initial portion is exterior to the insulation 53 and a lower portion projects into the heated interior of the combustion chamber. The conical lower portion 48 is located wholly within the interior of the combustion chamber generally at a central area thereof so as to receive the maximum heat within the combustion chamber.

The combustion chamber 40 is divided into the inner combustion stage 43 and the outer combustion stage 44 by a cylindrical wall 54 which surrounds the reactor vessel. Thus the wall 54 includes a first upper cylindrical portion 54A and a second lower generally conical portion 54B which follows generally the angle of the lower conical portion 48 so as to define a conical channel outside the conical portion 48 within which the main combustion occurs. The upper portion 54A defines a channel 55 surrounding the upper portion 45 of the reactor vessel. The wall 54 terminates at an upper edge 56 which is spaced from the top wall of the combustion chamber so as to allow gases to escape from the channel 55 around the top edge 56 and into the second combustion stage 44. The stage 44 surrounds the wall 54 and is located within a generally annular chamber surrounding the wall 54 and inside a side wall 58 of the combustion chamber. A flue 59 is connected to the side wall 58 of the second chamber 44 adjacent a bottom wall 60 of the combustion chamber. Thus the combustible gases exiting the mouth 51 of the cone pass generally in a flow as indicated by arrows through the first combustion stage 43 and into the second combustion stage 44 at the top and exit through the flue 59 at the bottom.

Within the flue 59 is mounted a heat exchanger 61 which extracts heat form the gases within the flue. A fan 62 draws the gases through the heat exchanger and from the flue and expels those gases into a stack 63 for suitable discharge to the environment. A secondary flue discharge 64 is provided as an emergency in event of key system component failure at the top of the second combustion stage 48 so as to receive gases as they exit the first combustion stage 43 at the top edge 56 of the wall 54. These gases also pass to the stack 63 for discharge. Inlet combustion air is fed by a fan 65 into a duct 66. The duct splits into a first portion 67 and a second portion 68. These two portions reconnect at an inlet supply duct 69. The portion 67 of the duct bypasses the heat exchanger 61. The portion 68 of the duct carries air through the heat exchanger 61 in the opposite path to the flue gases so as to receive heat from the flue gases. Thus the inlet air in the duct 69 can be heated to a controlled extent depending upon the amount of air passed along the duct paths 67 and 68 and thus the amount that is heated by the heat exchanger 61.

A flue gas cooling air inlet is provided upstream of the induced draft fan 62 so that, in the event that the flue gases exceed the induced draft fan 62 rating, cooling air is metered into the fan inlet.

The inlet air duct 69 splits into two supply ducts 71 and 72. The duct 71 supplies an annular plenum 73 surrounding the conical portion 54B of the wall 54. The conical portion 54B has a series of holes allowing the entry of combustion air from the duct 71 into the plenum 73 and from that plenum into the first combustion stage 43 at the location surrounding the cone 48.

The second duct 72 communicates air to a second plenum 75 below the cone 48. This plenum 75 has one or more openings 76 for feeding air into a bottom chamber 77 below the cone 48. The bottom chamber 77 is defined by a wall portion 78 at the bottom of the conical section 54B and extending to the bottom wall 60 of the combustion chamber. The bottom chamber 77 forms a receptacle for carbon and residual organics which fall from the cone 48 at the mouth 51. Thus the air from the duct 72 which passes into the plenum 75 is supplied into the carbon collected within the chamber 77 below the mouth 51. Most of the combustion product gasses escape from the plenum 77 into the bottom of the bed of carbon by passing through a pipe 79 having an upper cover 80 so that the air can escape at the top of the chamber 77 either above the bed of carbon or below the top of the bed of carbon depending upon the height of the bed which will vary as described herein.

Below the chamber 77 is provided a collection duct 81 for collecting ash and/or carbon so that the ash and any excess carbon can be removed through the duct 81 and discharged through a conveyor 82.

The air supply ducts 71 and 72 contain suitable damper controls to vary the amount of air flow into the plenums 73 and 75. The temperature of the air supply into these plenums can also be controlled as previously described by varying the ratio of air which is passed through the heat exchanger 61.

A further air inlet 83 is provided for allowing air into the top of the second combustion stage 44. In this way the air supply to the carbon bed can be controlled independently of the air supply to the first combustion stage 43 and independently of the air supply to the second combustion stage 44.

The temperature within the first combustion stage can be controlled to control the heat applied to the reactor vessel since the heat supply to the reactor vessel is needed to be reduced and increased depending upon the fuel content in the feed stock supply.

As the temperature control within the first combustion stage is independent of the combustion within the second combustion stage, the second combustion stage can be maintained at a required level so that it maintains the necessary high temperature and the necessary dwell time of at least two seconds to ensure that the combustion is sufficiently complete to meet acceptable standards.

The system illustrated in FIG. 5 also includes the following sensors and control valves (dampers):
  Combustion air heat exchanger damper (CAHXD)
  Induced draft fan cooling air damper (IDFCD)
  Tertiary (stage 2 combustion chamber) combustion air damper (TCAD)
  Carbon sump combustion air damper (CSCAD)
  Product gas combustion air damper (PGCAD)
  Emergency vent damper (EVD)
  Feedstock air lock level sensor (FSALLS)
  Feedstock makeup sensor, FSMUS
  Combustion air bypass damper (CABD)

The combustion region beneath the conical portion is arranged so as to minimize, or eliminate as practicable, flame contact with component surfaces. Combustion air is dispersed into the combustion chamber 43 through a plurality of perimeter openings in the combustion chamber perimeter at the plenum 73 such that the product gas flame occurs "in space"; i.e. in the cavity between the gasification cone 48 and combustion chamber enclosure 54. The invention utilises radiation for the instantaneous (speed of light) transfer of product gas flame energy onto "line of sight" surfaces that, due to fundamentals of radiation at higher operating temperatures (above 1,000 deg. C.), minimize temperature differentials between surfaces. This allows much higher operating temperatures for components fabricated of similar materials than possible where significant flame impingement occurs on combustion chamber surfaces.

The inner surface of the lower, high temperature chamber contains both top-to-bottom gas passage ways and openings in the chamber wall that allow unrestricted flow of gases around feed material therein and ready escape through numerous exits, including a bottom opening, into the external vessel that surrounds the lower, high temperature reaction chamber.

The system provides the following features

The system converts, in a high temperature environment, organic materials into a 2,200° F. (plus) flue gas stream and sterile ash.

Integrated drying/sizing/combustion system eliminates feedstock preparation requirements, other than gross lump sizing to accommodate feedstock system flow path dimensions;

Downward plug flow of feedstock undergoing surface gasification, no flow required through feedstock plug in gasification chamber;

Integral, continuous, forced draft conveyance of charcoal fines down through annular spaces around perimeter of feedstock plug 48 to primary chamber bottom outlet 81;

Feedstock plug surface agitation, where required, within the gasification chamber bottom outlet 51;

Sequential, continuous gravity flow, and collectively controlled gasification-producer gas combustion-charcoal combustion processes automatically maintain stable operation under rapidly and continuously changing permutations and combinations of feedstock quality, lump size and moisture content (up to maximum practicable moisture contents relative to feedstock energy; practical limitation anticipated in range of 80% moisture content);

High feedstock energy conversion efficiency attained by:
  system insulation limiting exterior surface temperatures to 200° F.;
  high efficiency heat transfer from residual flue gas temperatures to combustion air streams, condensing flue gas stream moisture and reducing stack temperatures to below 200° F.;

99% plus oxidation/removal of charcoal from ash stream;
Continuous, automatic ash extraction;
Minimal, if any, flue gas and ash treatment necessary to meet Kyoto accord objectives and 2004 emissions standards when processing biomass;

High temperature operation makes each system hazardous waste destruction ready, requiring only configuration, emissions testing and licensing for such applications;

Minimal materials handling;

High operating temperature materials lined containment vessel and ceramic reactor;

Close coupled combustor capable of outlet gas stream temperatures up to 2,000° C. (3,600° F.) and heat-up (from −40° to 2,000° C.) and cool down in less then 1-½ hours;

Capable of rapid turn down to, and automatic control at 10% of rated capacity. Temperatures at minimum capacity will be minimal required to sustain operation and build charcoal for auto recovery to processing temperatures in preparation for next production shift (e.g. hazardous waste destruction operation);

Grate free;

Charcoal reserve. Process dries/gasifies feedstock, then combusts charcoal;

No feedstock sizing (other then for feed hopper dimensions) or drying of feedstock;

Process random, transient variations in organic energy content and feedstock moisture levels up to self extinguishing values;

Tankless, atmospheric pressure steam generator; apparently product recently introduced where water injected right into flame of fossil fuelled burner;

Carbon lock up.

Further details of the specific construction of one example are set out in the following specification:

Feedstock System

Hopper
  304 stainless steel.
  Capacity: 250 cubic feet at material densities ranging from 10 to 60 pounds/cubic foot.
  Watertight.
  Bottom profiled to accommodate extension of feedstock conveyor screw.
  Structure and heavy duty thrust bearing mount at lower (back) end of hopper to withstand shearing forces when cutting bone and large wood pieces at hopper outlet.
  Structural frame to support lowest portion of hopper 18" minimum above floor surface.
  Ladder up side of hopper for viewing contents.

Conveyor
  304 stainless steel.
  Conveying capacity: 75 cubic feet/hour at material density of 10 pounds/cubic foot ranging to 25 cubic feet/hour at 60 pound/cubic foot.
  Conveyor: 40 feet long, 24" diameter, 30 degree incline. Conveyor tube 30 feet long, bottom 10 feet of conveyor screw extends through feedstock hopper. All flighting in hopper to 4" downstream of reinforced hopper exit band shall be heavy duty construction with leading edge saw tooth profiled for cutting through large ruminant bones and larger (up to 10" square) wood-plastic profiles. In-hopper portion has heavy duty shaft to take torque of cutter edged flighting.
  Totally enclosed conveyor tube. Bottom 50% of tube welded watertight; top 50% of tube hinged in 6' maximum lengths. Provide watertight gasketting at all hinged top cover seams. Provide quick release latch(s) for each hinged section.
  5 hp hydraulic motor and gear reduction unit for optimal combination of conveying capacity and hopper outlet shearing performance.
  Heavy duty bottom end thrust bearing for mounting onto hopper frame.
  Screw flighting, tube profiles and "anti spin" features designed to, as practicable, maximize feedstock lift performance (minimize material spinning about conveyor shaft) for complete range of materials ranging from liquid saturated slurries to dry "fluffy" products.
  Painted conveyor support structure and full length inclined access stair and handrails.
  Carrier and top end bearings to suit specified application.
  Discharge transition from 30" long×24" wide to 17" square at maximum angle of 20 degrees off vertical.

Air Lock
  304 stainless steel.
  Chute: ⅛" minimum thickness; horizontal air lock gates; ¼" minimum thickness.
  Gate slide openings gasketted with high quality materials. Provide gate wiper blades to minimize potential for leakage out of slide gate chamber.

17" square by 42" high.

Two slide gates in guide frames, each with hydraulic actuator and mounting mechanism.

Top slide gate at connection to feedstock conveyor discharge chute, bottom slide gate 34" below underside of top slide gate.

Processor

Shell

PYROCAST TG thermal shock resistant castable refractory, 3" (minimum) thick, as fabricated by Pyrotek phone (519) 787-1421 with exterior insulation and weather covering such as aluminum cladding.

Annular combustion air plenums (around sloped portions of upper product gas and lower carbon chambers) to be 3" (minimum) thick, PYROCAST TG.

Envelope insulation of material qualities and thickness necessary to limit the outer surface temperatures to less than 200 F at inner surface temperatures of 2,500, (likely in range of 12" thick.

Provide 80" high×36" wide removable panel in processor exterior shell for access into secondary combustion chamber. Access panel shall be complete with articulated structural support mechanism. Panel support mechanism to support panel at all times it is being moved completely clear of access opening; and stowed thereat.

Support structure, access stair and walkway around half of the top perimeter.

Gasification Chamber

Hexoloy silicon carbide rated for continuous operation up to 4,000 F.

Heat Exchanger

Heat exchanger shell and all hot side plenums/partitions are 3" thick, PYROCAST TG thermal shock resistant castable refractory as fabricated by Pyrotek.

Hot side: Continuously modulates between 500 cfm and 2,500 cfm at inlet temperatures ranging between 900 F and 2,700 F. Periodic, short duration (5 minute maximum anticipated) hot side inlet temperature spikes as high as 3,000 F possible. Ideally hot side inlet-outlet pressure differential less than 1" water column.

Cold side: zero flow to 1,500 cfm max. (modulates) at inlet temperatures ranging from −40 deg. F. to 140 deg. F.; design outlet temperature in range of 1,700 F at 2,500 F hot side entering temperatures. Ideally cold side inlet-outlet pressure differential less than 2" water column.

Heat exchanger tubes: type T-310 stainless steel, 9 of each 28" long, 3.5" O.D. pipe and serrated fin, 39 fins/ft; 0.05 thick fin; 1.25" fin height.

Insulated heat exchanger exterior with material qualities and thickness necessary to limit outer surface temperatures to less than 200 F at inner surface temperatures of 2,200 F (approx. 8" thick). Apply weather protection jacketing.

Induced Draft Fan

Rated (maximum) 6,000 scfm at 500 F and 6" water column; infinitely variable capacity down to 500 scfm at 300 F and reduced associated system curve pressures.

Driven by approx. 8 hp. hydraulic motor.

Combustion Air Fan

Rated (maximum) 2,000 scfm at 140 F and 4" water column; infinitely variable capacity down to 200 scfm at −40 F and reduced associated system curve pressures.

Driven by approx. 2 hp. hydraulic motor.

Ductwork

Type T-310 stainless steel rated for continuous operation at 2,100° F. for emergency flue gas vent between processor and vent damper, type 304 stainless steel from vent damper to stack connection.

Approximately 3" thick, PYROCAST TG for preheated combustion air between heat exchanger outlet and processor product gas and carbon sump combustion air plenums.

Type T-310 stainless steel for flue gas duct out of heat exchanger to downstream edge of induced draft fan cooling air inlet. Type 304 stainless steel from that location to induced draft fan suction connection and for the induced draft fan discharge into stack.

Type 304 stainless steel from combustion air fan discharge to heat exchanger connections.

Insulated exterior with material qualities and thickness necessary to limit outer surface temperatures to less than 200 F at inner surface temperatures of 2,200 F. Apply weather protection jacketing; except where identified as "non insulated" on system schematic drawing PS-1.

A stainless steel, expanded mesh heat shield over non insulated flue gas ductwork and around the induced draft fan. Provide "quick release" access doors in fan heat shield enclosure and at locations where access to mechanical and control system components is required.

Ash Extraction

Type 304 stainless steel, 10" diameter×20' long screw conveyor at 30 deg. incline.

Type 304 stainless steel dual slide gate conveyor discharge air lock.

Hydraulic conveyor motor, ½ hp.

Two hydraulic actuators for hydraulic gates.

Dampers

Product gas and carbon sump dampers are Hexoloy silicon carbide with V-notch orifice sliding plate overlapping a mating V-notch stationary plate.

Both dampers in combustion air ductwork upstream of heat exchanger, the secondary chamber combustion air inlet damper and the induced draft fan inlet cooling air damper shall be type 304 stainless steel, opposed blade, industrial grade design.

Emergency vent damper shall be T-310 stainless steel rated for continuous operation at 2,100 F, spring returned to normally open position guillotine design.

Seven hydraulic damper actuators.

Chimney

Free standing, 24" diameter×40' high, insulated double wall stainless steel construction code approved for continuous industrial application operation at 1,000 F.

Hydraulic Power Unit

Packaged, 3,000 psi output unit with factory electrical and control panel.

Hydraulic pump with full modulation capability over complete range of zero to full flow accomplished by unloading drive motor, not using pressure relief strategies.

Pump motor and drive coupling.

Full modulation controls over complete range from no load to 20 hp hydraulic output capacity.

Oil reservoir and cooler.

Hydraulic lines and control valves for 4 motors (2 conveyors and 2 fans), 4 two-position air lock gates, 1 two position guillotine emergency vent damper and 6 modulating dampers.

Propane Start UP Heater 1,000,000 Btuh output capacity manual insertion torch(s).

Operation is carried out in accordance with the following parameters:

General

PLC controlled with complete remote, real time process parameter display, remote plant control capability and appropriate password/local operator clearance/advisement of updates.

System graphic based data displays.

Capability to produce trend plots for selected system parameters.

All control setpoints fully adjustable.

Feedstock System

The feedstock system is locked out whenever the propane start up heater is operating.

During automatic operation, a material level detector (feedstock makeup sensor) below the lower feedstock air lock gate is operable.

Whenever no material is sensed by the sensor, the lower feedstock air lock gate closes. When a sensor proves the lower gate has closed, the upper feedstock air lock gate opens.

The feedstock conveyor starts when a sensor proves the upper gate is fully open, and operates until the feedstock air lock level sensor detects material, closing the upper feedstock gate.

Upon proof of upper gate closure, the lower feedstock gate opens, discharging the feedstock batch into the gasification cone feed chute. The lower feedstock gate remains open until there is no material detected by the sensor and the Feedstock System process repeats.

The feedstock conveyor can be manually reversed by a control system override.

Start Up

The following steps are carried out:

Ensure there is feedstock in conveyor hopper and the screw conveyor is operated manually until full to discharge opening.

Select "start up" mode.

Control system positions dampers as follows:

Emergency vent damper closed

Product gas combustion air damper open

Carbon sump combustion air damper is closed unless required to modulate to maintain the tertiary combustion air damper at about 15% open.

The combustion air damper of the second stage combustion chamber modulates to maintain desired residual oxygen in heat exchanger flue gas outlet.

Induced draft fan cooling air damper modulates to prevent induced draft fan inlet temperature from exceeding 500 F.

Combustion air bypass damper is closed

Combustion air heat exchanger damper is open

Air lock gate positions:

Feedstock upper air lock gate is closed

Feedstock lower air lock gate is open

Ash upper air lock gate is closed

Ash lower air lock gate is open

Start induced draft fan. Suction side static pressure sensor confirms operation. Variable speed drive operates to maintain −0.25" wc at heat exchanger flue gas inlet.

Start combustion air fan that is auto speed controlled to maintain −0.1" wc in heat exchanger combustion air outlet chamber.

Ignite propane torch(es) and insert into heat exchanger combustion air outlet plenum.

When the primary combustion chamber outlet temperature reaches 2,300 F, manually switch controls to "Automatic" and shut off propane torch(es), remove torch(es) and replace insulated plug(s) in torch opening(s).

When the control system is switched to automatic, the combustion air fan auto speed control resets to maintain 1.0" wc in the heat exchanger combustion air outlet chamber and the heat exchanger inlet pressure resets to −0.5" wc; maintained thereat by the induced draft fan variable speed control.

Operation

The combustion is controlled by the combination of residual oxygen in the heat exchanger flue gas outlet and the secondary combustion chamber outlet temperature (same as heat exchanger inlet temperature).

All dampers modulate linearly over their full range (0% to 100%) within temperature limits in the following table.

The EVD remains closed at all times the induced draft fan is proven operational and, when operational, there is a negative pressure at the heat exchanger inlet. It only opens on the combination of control system calling for induced draft fan operation, no negative static pressure at heat exchanger inlet while the system is operating in the automatic mode.

The IDFCD modulates to prevent induced draft fan inlet temperature from exceeding 500 F at any time. It is full closed whenever heat exchanger outlet temperature is at or below 500 F.

| HX inlet (F.) | Damper | Position | Comment |
| --- | --- | --- | --- |
| 2,700 | TCAD | modulating | Modulates to maintain 15 ppm residual oxygen in the heat exchanger flue gas outlet stream, opens further if necessary to restrict heat exchanger inlet to 2,700 F. |
| | PGCAD | modulating | First priority is maintaining TCAD 15% open until primary combustion chamber outlet temperature reaches 2,500 F., then modulates to hold that temperature while TCAD modulates open beyond 15% to maintain heat exchanger outlet oxygen. |
| | CSCAD | closed | |
| | CABD | open | |
| | CAHXD | closed | |
| 2,500* | TCAD | modulating | Modulates to maintain 15 ppm residual oxygen in heat exchanger outlet. |
| | PGCAD | modulating | First priority is maintaining TCAD 15% open until primary combustion chamber outlet temperature rises to 200 F. less than HX inlet, then modulates to hold that reduced temperature while TCAD modulates open beyond 15% to maintain heat exchanger outlet oxygen. |
| | CSCAD | modulating, conditional | Modulates, only if CAHXD full open, to maintain primary combustion chamber outlet temperature 200 F. less than HX inlet. If no carbon in sump, then TCAD will start modulating closed because of excess combustion air in processor. CSCAD reference will be TCAD going less than 15% open causing CSCAD to modulate first till it is full closed then PGCAD modulates closed if TCAD continues needing to reduce position (in arriving at 15% open) because of to much residual oxygen in stack. |
| | CABD | modulating | As required to hold primary combustion chamber outlet temperature at 200 F. less than HX inlet temperature; opens when primary combustion chamber outlet above that condition; reverse operation when below that condition |
| | CAHXD | modulating | Linearly and opposite to CABD |

*Normal operating condition.

Rich Fuel Batch Response

A rate of rise detector in the primary chamber outlet will cause the TCAD and CABPD to rapidly position full open at a temperature rise rate equal or exceeding 50 F in 2 seconds. The CAHXD will rapidly and simultaneously position full closed.

The dampers then migrate to positions necessary for 2,500 F operation.

Ash Removal

Operates off ash-charcoal interface level as sensed by temperature near bottom of carbon sump. A continuous "trickle" of combustion air will cause carbon in bottom of sump to slowly turn to ash. When only ash, temperature of interface will approach combustion air temperature, initiating timed ash extraction cycle after which interface temperature check will repeat until interface temperature rises, indicating presence of charcoal in ash.

"OFF" status is bottom air lock gate open, top gate closed.

When ash is detected in bottom of the carbon sump 81, a bottom air lock gate closes and a top gate opens (not shown). Ash conveyor 82 runs till air lock level detector senses ash pile just below top gate. The conveyor stops, the top gate closes and the bottom gate opens. The bottom gate then closes, the top gate opens and the cycle repeats till the ash-carbon interface temperature sensor detects a temperature rise due to charcoal burning.

A rapid response anticipatory controls is operated with a residual oxygen sensor in the gas stream in the stack 63 which mitigates smoke emissions during extreme variations in feedstock batch quality. A rapid rise in the temperature in the first stage combustion chamber 43 indicates an event of extreme increase in feedstock quality (energy content) in the retention cone 48. Such an occurrence causes the control system to:

- immediately reduce first stage combustion air supply through plenum 73 (thus the temperature around the feedstock gasification cone 48 falls; slowing the processing rate),
- initiate/increase combustion air bypass through the duct 67 around the heat exchanger 61 to further cool the first stage combustion chamber 43 (if required),
- and positions the second stage combustion air damper TCAD 100% open to maximize the organic burn rate therein to reduce residual oxygen in stack gas stream.

The evenly distributed (around chamber perimeter) and progressive apportionment (vertical spacing of inlet ports) of preheated product gas combustion air from the plenum 73 causes burning in the primary combustion chamber 43 as long as any product gas exists therein.

The combustion gases stack 79 in the carbon sump and perimeter supply of combustion air around the bottom thereof from the plenum 75 facilitates the controlled burn of carbon inventory at the bottom of the carbon sump 77 and allows unrestricted hot gas flow up the center of the carbon inventory. This provides essentially instantaneous heating of the gasification cone chamber 48 (when supplemental energy is required to sustain processor operation) as the hot combustion gases flow directly upwardly from the cap 80 at the top of the stack 79 into the mouth 51 instead of flowing through and heating up the carbon inventory. Flow through the carbon inventory is undesirable because it both changes the temperature and combustion performance thereof and reduces combustion gas temperatures to essentially whatever the highest carbon inventory temperature would be. The hot combustion gases stack 79 allows maximum temperature transfer directly into the chamber 43 surrounding the gasification cone, minimizing response time when low energy feedstock batches (up to and including 100% water) are processed.

A localized combustion zone (bottom of the carbon sump 77) provides high rate, high temperature conversion/destruction of most carbon and residual organics before final, complete combustion occurs in the carbon sump ash discharge tube 81.

All processor ash flows through the discharge tube 81 against a low rate counter flow of preheated combustion air from the plenum 75. The preheated combustion air causes entrained organic material to combust at a flame front; raising the temperature thereat. That phenomenon is used to control the ash extraction system. A temperature sensor(s) in the ash tube will indicate whether the flame front (of any organic material that may be remaining in the ash) is at or downstream of the sensor location (temperature thereat higher than combustion air supply temperature) or upstream of the sensor(s) location when temperature in the tube is close to that of the combustion air supply. The ash extraction system will automatically operate whenever the temperature in the ash tube is at or near the combustion air supply temperature; stopping whenever the sensors detect a significantly higher temperature than the combustion air temperature.

In an alternative arrangement (not shown) two negative pressure chambers are provided as the reactor vessel. This includes an upper wet feedstock conditioning chamber and a lower, in-line, high temperature reaction chamber. Controlled volumes of preheated combustion air are drawn into the top of the upper chamber. A system of deflectors around the interior surface of the upper chamber provides an annular space around feedstock therein, creating a preheated combustion air flow path down into the lower, high temperature reactor chamber. This feature facilitates evaporation of water that may be at or near the vertical perimeter surface of the feedstock charge, preventing liquid water flow onto lower chamber, high temperature surfaces.

Preferably air from the upper chamber fuels the random combustion (depending on feedstock quality and moisture content) of mainly feedstock and product gas generated at and near the feedstock-lower chamber surfaces interface. The combination of this combustion and radiation from the lower chamber interior surfaces collectively contribute to the feedstock destruction rate. The lower chamber is engulfed in flame resulting from combusting the remainder of product gas that exits the lower high temperature chamber and, when supplied with controlled combustion air volumes, portions of the charcoal inventory at the bottom of the system.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for combustion comprising:
   providing a combustible feed material;
   providing a combustion container within which the combustion of the feed material occurs;
   the combustion container including a reactor portion for initial heating of the feed material;
   the combustion container including an exterior chamber within which at least a part of the reaction portion is located such that combustion of material in the exterior chamber causes heating of the feed material in the reactor portion;
   feeding the feed material into the reactor portion at a feed location;

the reactor portion including at least one contact surface onto which the feed material is deposited and against which the feed material is in contact when heated;

causing the combustion in the exterior chamber to heat the feed material in contact with said at least one contact surface of the reactor portion to a temperature above 600 degrees Celsius so as to cause the feed material in contact with said at least one contact surface of the reactor portion to break down to breakdown products comprising solid breakdown materials and gaseous breakdown materials including combustible gases;

introducing combustion air into the exterior chamber for mixing with the breakdown products to effect combustion thereof;

causing the breakdown products to exit the reactor portion into the exterior chamber for combustion therein to form solid combustion products and gaseous combustion products;

providing a flue for extraction of the gaseous combustion products from the exterior chamber and generating a flow of the gaseous combustion products from the exterior chamber into the flue;

providing an extraction system for the solid combustion products from a bottom of the exterior chamber;

while the feed material is in contact with said at least one contact surface of the reactor portion, causing downward movement of the feed material by gravity acting on the feed material from the feed location downwardly to a bottom of said at least one contact surface;

causing the solid breakdown products to exit downwardly under gravity from the bottom of said at least one contact surface of the reactor portion into said exterior chamber;

and arranging the shape and orientation of said at least one contact surface of the reactor portion and controlling the combustion in the exterior chamber so as to maintain the feed materials in contact with said at least one contact surface of the reactor portion for a sufficient period of time to allow the breakdown to occur.

2. The method according to claim 1 wherein the reactor portion is formed from a ceramic material.

3. The method according to claim 1 wherein the exterior chamber is lined with a refractory material.

4. The method according to claim 2 wherein the ceramic material is hexoloy or equivalent.

5. The method according to claim 1 wherein the reactor portion projects into the exterior chamber in a manner which allows the combustion gases to pass around the reactor vessel for heating the reactor vessel.

6. The method according to claim 5 wherein the reactor vessel includes a portion which descends down into the exterior vessel such that the combustible gases of the gaseous breakdown materials pass around all sides.

7. The method according to claim 6 wherein the reactor portion is generally conical converging from an upper mouth into which the feed materials are deposited to a smaller bottom opening.

8. The method according to claim 1 wherein said at least one contact surface comprises movable members.

9. The method according to claim 1 wherein said at least one contact surface comprises a substantially planar surface.

10. The method according to claim 9 wherein said at least one contact surface includes members which are movable relative to the planar surface.

11. The method according to claim 1 wherein there is provided a bed of the solid breakdown products at the bottom of the exterior chamber onto which the solid breakdown products from the reactor portion fall.

12. The method according to claim 11 wherein the solid breakdown products from the reactor portion are free to fall onto the bed without any intervening grate.

13. The method according to claim 1 wherein the feed materials move from the feed location through the reactor portion to the bottom of the exterior chamber solely by gravity without assistance of moving elements providing motive power thereto.

14. The method according to claim 1 wherein there is provided a carbon bed in the exterior chamber from carbon produced in the solid breakdown products and wherein air supply to the exterior chamber is controlled to increase or decrease the rate of combustion of the carbon bed such that the temperature of the exterior chamber is maintained at a required temperature above 600 degrees Celsius.

15. The method according to claim 14 wherein heat from combustion of the carbon bed is used to maintain the temperature at the required temperature without additional fuel.

16. The method according to claim 14 wherein the feed material includes more than 50% water content while the carbon bed maintains the temperature at the required temperature without additional fuel.

17. The method according to claim 1 wherein the feed material includes a slurry containing at least 50% water and wherein said at least one contact surface of the reactor portion is shaped and arranged to maintain the slurry in the reactor portion for a sufficient period of time to effect said breakdown while allowing the breakdown products to fall from said at least one contact surface of the reactor portion under gravity.

18. The method according to claim 1 wherein release of carbon dioxide to the atmosphere is reduced by removing carbon from the carbon bed at the bottom of the exterior chamber.

19. The method according to claim 1 wherein there is provided a water injection system for adding water into the reactor portion.

20. The method according to claim 1 wherein feed materials are added to the reactor portion to maintain feed products in the reactor portion for operation in a continuous mode.

21. The method according to claim 1 wherein combustion air, used to oxidize the gaseous breakdown products leaving the reactor portion and carbon particles in the exterior chamber, is preheated to over 1,000 degrees Fahrenheit.

22. The method according to claim 1 wherein the volume and temperature of combustion air used to oxidize the gaseous breakdown products leaving the reactor portion and carbon particles in the exterior chamber are controlled to control the rate of breakdown of the feed material in the reactor portion.

23. The method according to claim 1 wherein a combustion region in the exterior chamber is arranged to minimize flame contact with an interior surface of the exterior chamber and an exterior surface of the reactor portion.

24. The method according to claim 23 wherein combustion air is dispersed into the combustion region through a plurality of openings in a perimeter of the exterior chamber such that flame occurs in a space between the exterior surface of the reactor portion and the interior surface of the exterior chamber.

25. The method according to claim 1 wherein the combustion is arranged to provide a retention time of the gaseous combustion products of at least the order of two seconds in the exterior chamber.

26. The method according to claim 1 wherein the exterior chamber includes a first chamber defining a first combustion stage arranged to heat the reaction portion and a second chamber defining a second combustion stage.

27. The method according to claim 26 wherein the combustion is arranged to provide a retention time of the gaseous combustion products of at least the order of two seconds in the second combustion stage and wherein the temperature of the reaction portion is controlled by varying the temperature in the first stage.

28. The method according to claim 27 wherein the second chamber surrounds the first chamber and the reactor portion is located within the first chamber.

29. The method according to claim 27 wherein the volume and temperature of combustion air supplied to the first chamber is used to control the temperature in the reactor portion.

* * * * *